Jan. 16, 1940.  A. P. FOX ET AL  2,187,684
LUBRICATING APPARATUS
Filed Jan. 21, 1938  3 Sheets-Sheet 1

Alexander P. Fox,
Victor G. Klein,
Inventors.
Delos G. Haynes,
Attorney.

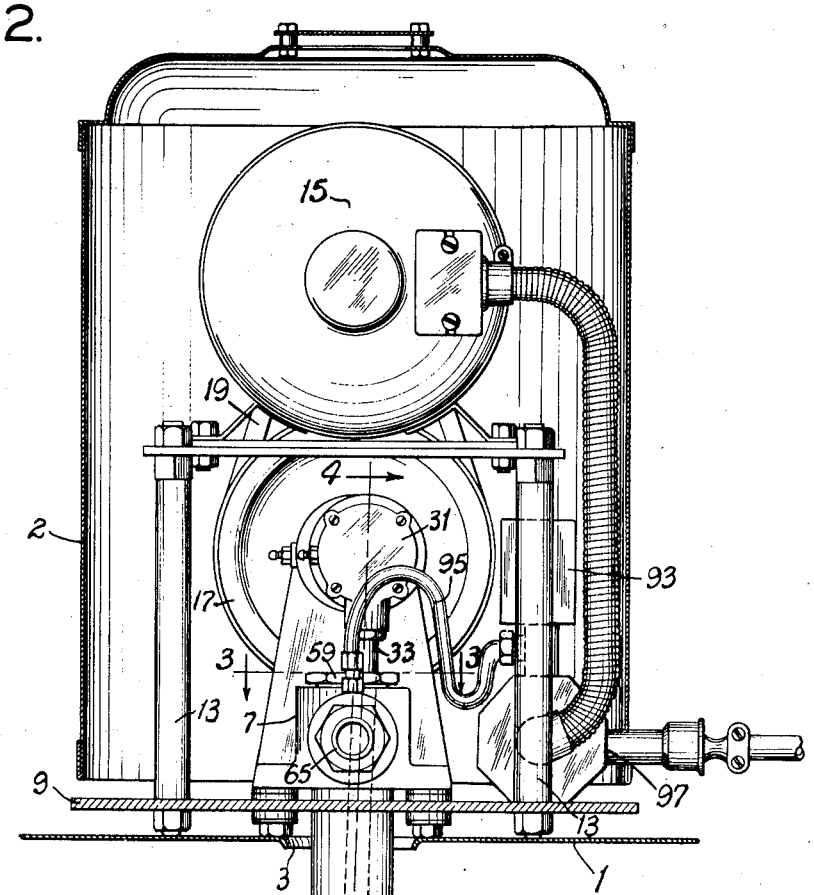
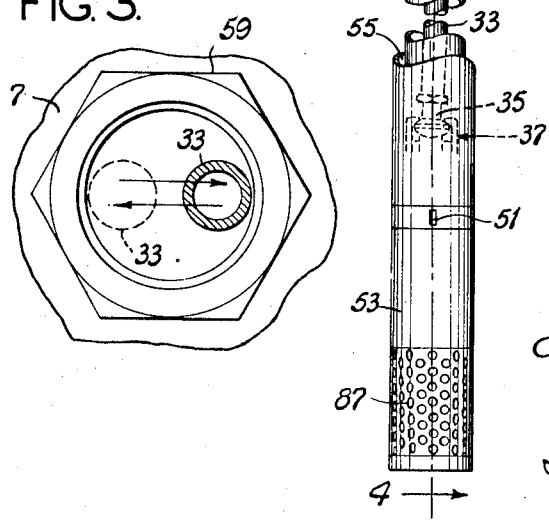

Jan. 16, 1940.　　A. P. FOX ET AL　　2,187,684
LUBRICATING APPARATUS
Filed Jan. 21, 1938　　3 Sheets-Sheet 3

Alexander P. Fox
Victor G. Klein,
Inventors,
Delos G. Haynes,
Attorney

Patented Jan. 16, 1940

2,187,684

UNITED STATES PATENT OFFICE 2,187,684

LUBRICATING APPARATUS

Alexander P. Fox and Victor G. Klein, St. Louis, Mo., assignors to Lincoln Engineering Company, St. Louis, Mo., a corporation of Missouri Application January 21, 1938, Serial No. 186,157

10 Claims. (Cl. 103—218)

This invention relates to lubricating apparatus, and with regard to certain more specific features, to a barrel pump, for pumping lubricants from barrels and the like.

Among the several objects of the invention may be noted the provision of a motor-driven barrel pump in which conditions of low side thrusts are attained in the slider-crank mechanism of the pump and also the possibility of using minimum clearances at the crank-pin bearing; the provision of apparatus of this class which operates more quietly and in which power requirements are reduced; and the provision of apparatus of the class described in which is employed improved priming means. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which is illustrated one of various possible embodiments of the invention, Fig. 1 is a front elevation, parts being shown in section;

Fig. 2 is a side elevation;

Fig. 3 is an enlarged horizontal section taken on line 3—3 of Fig. 2;

Similar reference characters indicate corresponding parts throughout the several views of the drawings.

As shown in the United States Patent 1,970,591 of Frank S. Barks, dated August 21, 1934, it is known to use a lance-like cylinder for insertion into a lubricant barrel or the like, this cylinder carrying at its upper end a pumping engine for operating a piston in the cylinder. In apparatus of this class, it has been the custom to use a packing gland at the upper end of the cylinder through which passes the piston rod which reciprocates the piston in the cylinder. Such a packing gland necessitated a translatory action of the piston rod, as distinguished from an oscillating action.

When application is made to a pump of this class of an electric motor for driving it, it is necessary to translate rotary motion into reciprocating motion. If this translation is accomplished by a slider-crank mechanism all parts of which are located above the packing gland, then, in order to make the apparatus compact enough, the so-called rod ratio (ratio of the length of connecting rod to length of crank) is so small that difficulties are encountered as follows:

(a) A substantial side thrust was placed upon the reciprocating elements so that the piston, pump cylinder and the packing gland wore;

(b) Excessively large clearances were necessitated at the crank pin, which resulted in undesirable knocking at high speeds and high pressures; and, (c) The power requirements were high, because of the friction resulting from moving a long piston rod through lubricant at high pressure.

Figure 1:
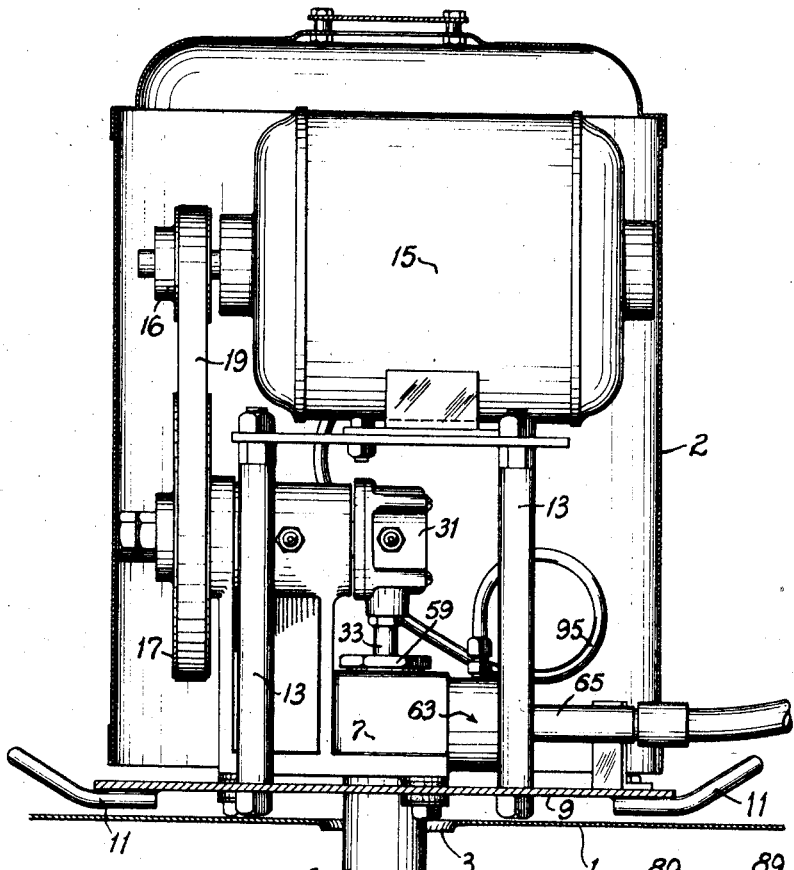

Referring now more particularly to Fig. 1, there is fragmentarily shown at numeral 1 a barrel having an upper opening 3 through which the transmission cylinder 5 is adapted to be thrust so as to place the latter within the barrel to reach to its bottom.

Figure 4:
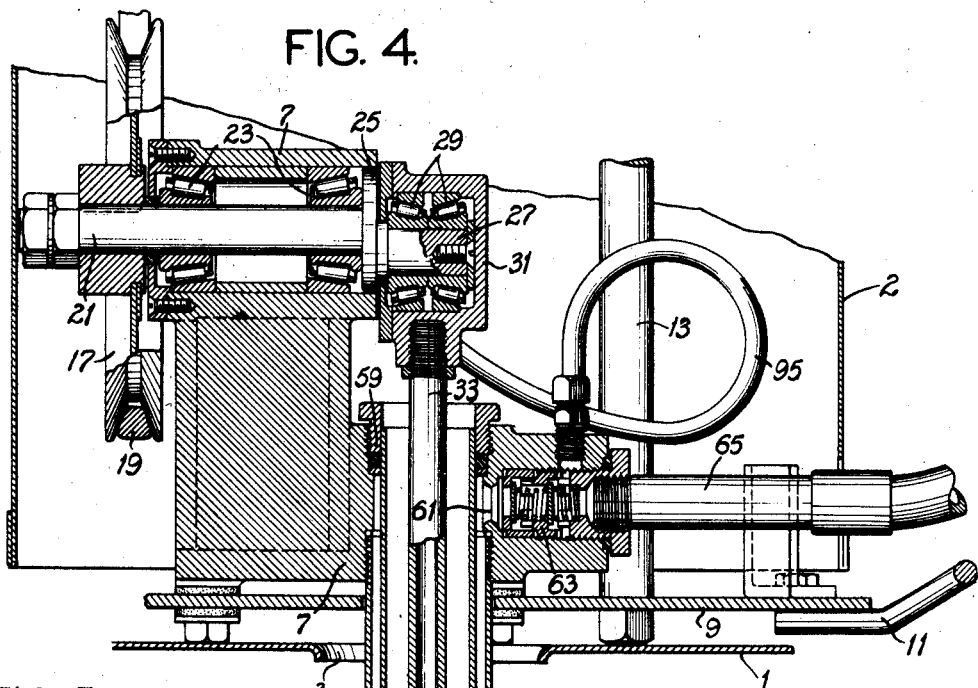
Fig. 4 is a fragmentary, enlarged vertical section taken on line 4—4 of Fig. 2, but with the crank mechanism shown nearer lower dead center.

At its upper end, the cylinder 5 is fastened by a threading into a body 7, the latter being attached to a supporting plate 9 having handles 11 (Fig. 4).

Pillars 13 extending upwardly from the plate 9 support an electric motor 15. The motor 15 has a pulley 16, which is belted to a pulley 17 by a belt 19.

The pulley 17 is attached to a spindle 21 (Fig. 4), which is carried in bearings 23 in the body 7. Attached to the spindle 21 is crank disc 25 which eccentrically carries a crank pin 27. On the pin 27 are bearings 29. Around the bearings 29 is a housing 31 which carries the outer bearing races and which is threaded to the crank-end of a hollow connecting rod 33.

The lower end of the connecting rod 33 has threaded therein the ball head 35 of a ball-and-socket joint 37. The socket portion 39 of the joint 37 is backed by a resilient material 41 to eliminate impact at this point.

The socket end of the joint 37 is carried at the upper end of the piston rod 43, the latter passing slidably but with a sealing fit through a guide 45. Guide 45 has openings 47 therethrough and a recess 49 around the piston rod 43 with an opening 51 forming a return to the lubricant supply for such lubricant as may creep and leak into the space between the piston rod and the member 45. The member 45 is in effect the head of a pump cylinder 53 which forms a downward continuation of the downwardly extending transmission cylinder 5.

As will be seen from Fig. 4, the passages 47 communicate with an annular passage 55 located between the cylinder 5 and second and inner cylinder or tube 57, which is threaded to the upper side of the cylinder head 45 and which passes upwardly into the body 7 where it is held and packed against leakage by a packing gland 59. Thus the passage 55 forms a conduit for the lubricant which is pumped through the openings 47.

The body 7 has an outlet 61 with an outwardly-opening, double-check valve 63 therein which permits flow to the lubricant outlet line 65 and prevents return flow.

The purpose of the inner tube 57 is to provide a space or well within which the connecting rod 33 may oscillate, as indicated in Fig. 3, without the necessity of using any packing at the swinging upper end of said rod itself.

Referring to the lower end of piston rod 43, it has a downwardly extending extension 67 upon which is slidably mounted a check valve 69, the latter being normally pressed downwardly by a spring 71 against a valve seat 73. A packing 90 slidably seals the valve 69 to rod 67. The seat 73 is in the upper end of a priming member 75, shown more in detail in Figs. 4 and 5.

The priming member 75 has a cylinder 77 in which is slidable a piston 79 on the end of extension 67 and which actually does the priming. The lower end of the cylinder 77 and a cup-shaped portion 81 in a lower head 83 form a dead-end socket into which the piston 79 plunges on the down stroke.

Inlet ports 85, covered by an open-mesh strainer 87, communicate with the upper end of the cylinder 77 at two different elevations (Figs. 5 and 7), and are crossed by the piston 79 during movement of the latter.

Figure 7:
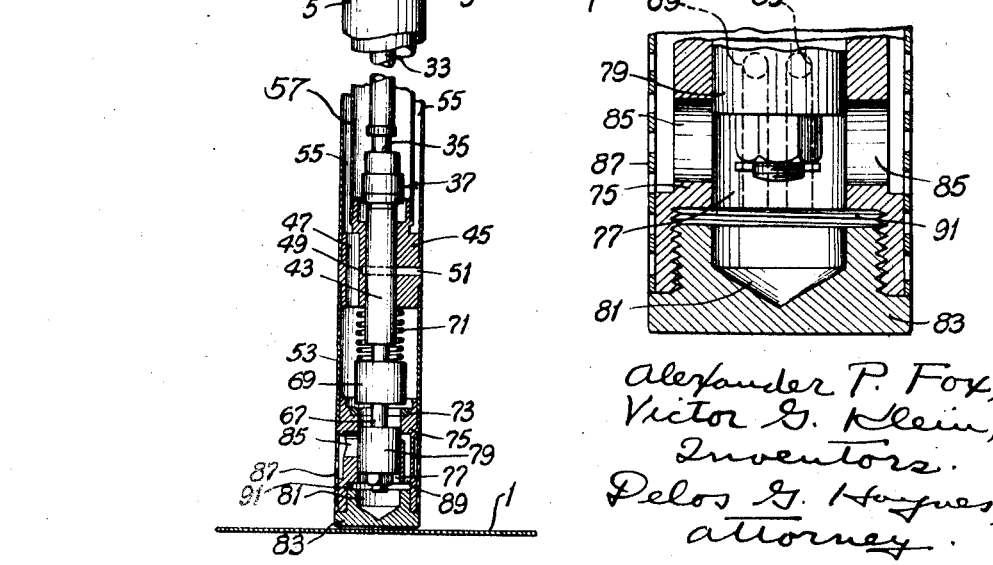
Fig. 7 is a vertical section taken on line 7—7 of Fig. 6.
Figure 5:
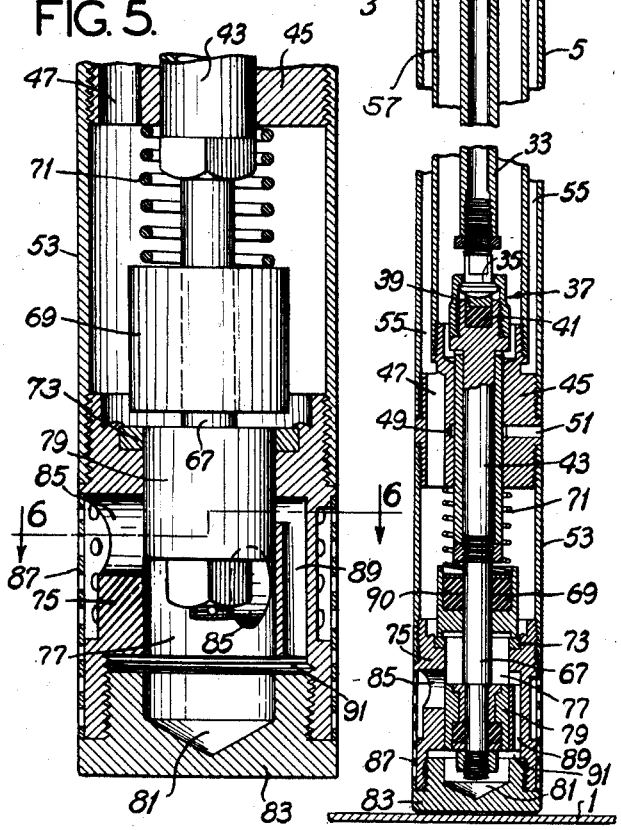
Fig. 5 is an enlarged vertical section showing a piston and primer detail.
Figure 6:
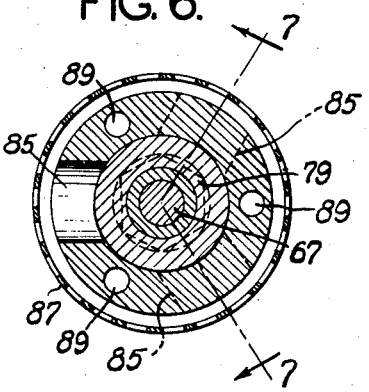
Fig. 6 is a cross section taken on line 6—6 of Fig. 5.

As shown in Figs. 5 and 7, the elevations of two of the inlet openings 85 are lower than the other one, and they are arranged, as shown in Figs. 6 and 7, such that the length of the piston 79 reaches from the uppermost part of the highest opening 85 to the lowermost part of the lowest openings 85.

Staggered peripherally with respect to the inlet openings 85 are priming openings 89 which communicate from the upper end of the cylinder 77 to its lower end, by way of the clearance 91. All openings 89 enter cylinder 77 at an elevation corresponding to the upper portion of the highest inlets 85 (see Figs. 4, 5 and 7).

The operation of the parts shown in Figs. 5 and 6 is as follows:

When the piston rod 43 is reciprocated (by translation), the piston 79 moves from a position, such as shown in Fig. 5, down to the position shown in Fig. 4, and back. Upon the upstroke, it uncovers the inlet ports 85 and draws in a charge of lubricant. The hydraulic head on the lubricant also aids the filling operation to cylinder 77.

As the piston 79 descends, it closes successively the inlet ports 85, and just as it closes all of them (at a period slightly after the period illustrated in Fig. 1), the upper edge of the piston opens the upper port 85 and priming ports 89. (Ports 89 are in communication with the charge of lubricant which is trapped under the piston 79.) This forcibly expels the lubricant upwardly into position above the piston. At this time, there is only a slight opening in the upper edge of the uppermost inlet opening 85. Thus there is obtained a positive infilling of the space above the piston 79 and below the valve 69. Excessive primed lubricant may flow back to the source through the rapidly opening inlet ports 85.

On the down stroke, the valve 69 is closed by reason of the intrusion of the extension 43 into the space below the guide 45. This intrusion also forces fluid through the ports 47, annular passage 55, outlet 61 and to pipe 65 to the check valve 63.

Upon the upstroke, the charge above piston 79 is forced out past the valve 69, also to be delivered through the openings 47. The device is thus double acting, pumping lubricant under high pressure, but this pressure is not applied to the connecting rod 33, or to what would ordinarily be its equivalent, a reciprocating piston rod. The rod 43, 67, upon which pressure is exerted, is relatively short. The inner pipe 57 in effect provides a compartment or well in which the connecting rod 33 may freely move in its oscillation, such as indicated in Figs. 2 and 3.

The pressure developed and the volume of displacement per stroke is determined by the ratio of the areas of extensions 43 and 67 (on the down stroke) and by the ratio of the areas of the rod 43 and piston 79 (on the up stroke).

By the above construction there is obtained the low, instead of a high, rod ratio, with consequently lower connecting-rod thrust for a given force on piston 79. Lower thrusts permit of lower bearing clearances at bearings 29. Lower bearing clearances mean less knocking and a quieter machine. Thus, the present construction provides a quieter acting machine which is much less subject to wear due to side thrust, and one which requires less power.

To complete the description, there is shown at numeral 93 (Fig. 2) a pressure-responsive switch which responds to pressure in the by-pass pipe 95 connected to the outlet pipe 65 from the check valve 63. The switch 93 is adapted to break the motor circuit 97 whenever a predetermined pressure is reached. Thus, whenever the valve (not shown) in the outlet of the line 65 is opened to reduce the pressure, the motor 15 automatically starts, so that the apparatus is set into motion. On the other hand, when said valve is closed and the pressure continues to build up, said pressure has a limit according to the setting of the pressure-responsive switch 93.

It will be seen that in certain respects the equivalent of the annular conduit 55 may be obtained by using one or a plurality of parallel, spaced pipes between the outlet 47 and the outlet 61. Although, in the absence of a completely circular contour, such pipes would permit lubricant under barrel pressure to surround the connecting rod 33, such a pressure would be lower than the high pressure of the lubricant in the pipe or pipes.

So far as the priming feature is concerned, shown in Figs. 5, 6 and 7, this is an improvement upon the priming feature shown in the application of Frank S. Barks, Serial No. 101,031, filed September 16, 1936, for Pumping apparatus, patented June 28, 1938, #2,122,020.

As shown on Figs. 1, 2 and 4, the plate 9 supports a housing 2 which covers the various parts above the drum, thus providing a neat appearance for the apparatus when in position on a lubricant drum.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

We claim:

1. Apparatus of the class described comprising a pump having an inlet and an outlet, reciprocating parts in said pump adapted to draw material into said inlet and to force it out of said outlet, means for reciprocating said parts comprising a crank located at a distance from the pump, a connecting rod articulating said crank with said reciprocating parts, and an annular conduit extending from the outlet of said pump to a point adjacent said crank, said annular conduit surrounding the connecting rod and having an outlet.

2. In apparatus of the class described, a pump having an inlet and an outlet, reciprocating parts in said pump adapted to draw material into said inlet and to force it out of said outlet, means for reciprocating said parts comprising a crank located at a distance from the pump, a connecting rod articulating said crank with said reciprocating parts, an annular conduit extending from the outlet of said pump and surrounding the connecting rod and itself having an outlet, and a seal for the end of the conduit at a substantial distance from said reciprocating parts, said seal surrounding the connecting rod.

3. In apparatus of the class described, a barrel, a pump adapted for placement in said barrel, said pump having an inlet and an outlet in said barrel, reciprocating parts in said pump adapted to draw material into said inlet and to force it out of said outlet, means for reciprocating said reciprocating parts comprising a frame and a crank thereon located outside of the barrel, a connecting rod articulating said crank with said reciprocating parts in the barrel, and a conduit extending from the pump to said frame to form a connection between the pump and said frame and to confine material under pressure and to carry it from said outlet to a point outside the barrel.

4. A pump comprising a frame, a rotary crank thereon, said frame having a hollow portion with an outlet, a pump cylinder located at a distance from said frame, said pump cylinder having an inlet and an outlet, reciprocating parts in the cylinder adapted to draw material into the inlet and expel it through the pump outlet, an annular conduit connecting the outlet of the pump cylinder with the outlet of said frame, and a connecting rod articulating said crank with said reciprocating parts, said annular conduit surrounding the connecting rod.

5. A pump comprising a frame, a rotary crank thereon, said frame having a hollow portion with an outlet, a pump cylinder located at a distance from said frame, said pump cylinder having an inlet and an outlet, reciprocating parts in the cylinder adapted to draw material into the inlet and expel it through said pump outlet, an annular conduit connecting the outlet of the pump cylinder with the outlet of said frame, and a laterally-oscillating connecting rod articulating said crank with said reciprocating parts, said annular conduit surrounding the connecting rod.

6. A pump comprising a frame, a rotary crank thereon, said frame having a hollow portion with an outlet, a pump cylinder located at a distance from said frame, said pump cylinder having an inlet and an outlet, reciprocating parts in the cylinder adapted to draw material into the inlet and expel it through said pump outlet, an annular conduit connecting the outlet of the pump cylinder with the outlet of said frame, a laterally-oscillating connecting rod articulating said crank with said reciprocating parts, said annular conduit surrounding the connecting rod, and means for sealing off said conduit in the frame and around said connecting rod.

7. A pump comprising a barrel, a frame, a pump cylinder at a distance from said frame adapted to become positioned in said barrel, said pump cylinder having an inlet and an outlet, reciprocating parts in the pump cylinder adapted to draw material into the inlet and expel it through said outlet under pressure, said frame being adapted to be located on the barrel and outside it and having a rotary crank and an outlet, a connecting rod articulating said crank and said reciprocating parts, and communicating means between the outlet of the pump cylinder and the outlet of said frame, the relative positions of the communicating means and of the connecting rod being such as to prevent application of lubricant under the pressure of the pump to said connecting rod.

8. Lubricating apparatus comprising a lubricant drum, a frame adapted to be located outside of said lubricant drum, said lubricant drum having an opening, a pump unit spaced from said frame and adapted to be passed through said opening into the drum, said pump unit having an inlet and an outlet which are both located relatively near the bottom of the drum, reciprocating parts in said pump unit, said frame having an outlet, a rotary crank on the frame, a connecting rod articulating said crank with said reciprocating parts of the pump and passing through said drum opening, and concentric cylinders related to effect a communication between the outlet of the pumping unit and the outlet of said frame, the inner one of said cylinders surrounding said connecting rod and having an opening large enough to permit lateral motion of said connecting rod.

9. Lubricating apparatus comprising a lubricant drum, a frame adapted to be located on top of said lubricant drum, said drum having an opening and a bottom, said frame being hollow and having an outlet outside of said drum, a rotary crank on the frame, a pumping unit adapted to pass through the opening in the drum, said pumping unit having an inlet and an outlet, reciprocating parts in the pumping unit adapted to draw material into the inlet and compress said material through the said pump outlet under pressure, concentric tubes forming a connection between said pumping unit and said frame and a communication between the outlet of the pumping unit and the outlet of the frame, and an oscillating connecting rod articulating said crank with said reciprocating parts and passing through the inner one of said concentric tubes.

10. Lubricating apparatus comprising a lubricant drum, a frame adapted to be located on top of said lubricant drum, said drum having an opening and a bottom, said frame being hollow and having an outlet outside of said drum, a rotary crank on the frame, a pumping unit adapted to pass through the opening in the drum, said pumping unit having an inlet and an outlet near the drum bottom, reciprocating parts in the pumping unit adapted to draw material into the inlet and compress said material through the said last-named outlet under pressure, concentric tube means forming a connection between said pumping unit and said frame and a communication between the outlet of the pumping unit and the outlet of the frame, an oscillating connecting rod articulating said crank with said reciprocating parts and passing through the inner one of said concentric tubes, and means sealing the ends of the tubes to said body and around an oscillating portion of said connecting rod.

ALEXANDER P. FOX.
                VICTOR G. KLEIN.